(12) United States Patent
Toth et al.

(10) Patent No.: US 12,294,049 B2
(45) Date of Patent: May 6, 2025

(54) METHOD OF PREPARATION OF A GARNET-TYPE INORGANIC MATERIAL

(71) Applicant: SPECIALTY OPERATIONS FRANCE, Lyons (FR)

(72) Inventors: Réka Toth, Paris (FR); Laure Bertry, Aubervilliers (FR); Valérie Buissette, Paris (FR); Thierry Le Mercier, Rosny-sous-Bois (FR); Marc-David Braida, Bry-sur-Marne (FR); Robin Amisse, Issy-les-Moulineaux (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 473 days.

(21) Appl. No.: 17/625,996

(22) PCT Filed: Jul. 29, 2020

(86) PCT No.: PCT/EP2020/071436
§ 371 (c)(1),
(2) Date: Jan. 10, 2022

(87) PCT Pub. No.: WO2021/023599
PCT Pub. Date: Feb. 11, 2021

(65) Prior Publication Data
US 2022/0278355 A1 Sep. 1, 2022

(30) Foreign Application Priority Data
Aug. 6, 2019 (EP) .................................... 19315084

(51) Int. Cl.
| | |
|---|---|
| *H01M 10/05* | (2010.01) |
| *C01G 25/00* | (2006.01) |
| *C01G 33/00* | (2006.01) |
| *C01G 49/00* | (2006.01) |
| *H01M 10/0525* | (2010.01) |
| *H01M 10/056* | (2010.01) |

(52) U.S. Cl.
CPC ........ *H01M 10/056* (2013.01); *C01G 25/006* (2013.01); *C01G 33/006* (2013.01); *C01G 49/0054* (2013.01); *H01M 10/0525* (2013.01); *C01P 2002/30* (2013.01); *C01P 2002/52* (2013.01); *C01P 2004/51* (2013.01); *C01P 2004/61* (2013.01); *C01P 2004/62* (2013.01); *C01P 2006/40* (2013.01); *H01M 2300/0091* (2013.01)

(58) Field of Classification Search
CPC ............. H01M 10/056; H01M 10/052; H01M 10/0525; H01M 2300/0091; C01G 25/006; C01G 33/006; C01G 49/0054; C01P 2002/30; C01P 2002/52; C01P 2004/51; C01P 2004/61; C01P 2004/62; C01P 2006/40
See application file for complete search history.

(56) References Cited

U.S. PATENT DOCUMENTS

| | | |
|---|---|---|
| 6,203,944 B1 | 3/2001 | Turner et al. |
| 8,956,994 B2 | 2/2015 | Ifrah et al. |
| 2016/0293988 A1 | 10/2016 | Sakamoto et al. |

(Continued)

FOREIGN PATENT DOCUMENTS

| | | |
|---|---|---|
| JP | 2012224520 A | 11/2012 |
| JP | 2013256435 A | 12/2013 |

(Continued)

OTHER PUBLICATIONS

Thangadurai V. et al., "Novel Fast Lithium Ion Conduction in Garnet-Type Li5La3M2O12 (M=Nb, Ta)", Journal of the American Ceramic Society, 2003, vol. 86 (3), p. 437-440.

(Continued)

*Primary Examiner* — Raymond Alejandro
(74) *Attorney, Agent, or Firm* — Osha Bergman Watanabe & Burton LLP

(57) ABSTRACT

The present invention relates to a method of preparation of a garnet-type inorganic material. It also relates to the garnet-type inorganic material itself. The process comprises the following steps: (1) bringing an aqueous solution S comprising (i) a salt of zirconium, (ii) a salt of lanthanum and (iii) a salt of the element A or a precursor of an oxide of element A into contact with an aqueous solution of a basic compound, as a result of which a precipitate suspended in the reaction medium is obtained; (2) stirring the reaction medium obtained at the end of step (1) for at least 30 min; (3) bringing the precipitate obtained at the end of step (2) into contact with an additive selected in the group consisting of: anionic surfactants; nonionic surfactants; polyethylene glycols; carboxylic acids and their salts; and surfactants of the carboxymethylated fatty alcohol ethoxylate type; (4) calcining in air the precipitate recovered at the end of the previous step at a temperature which is at least 400° C.; (5) bringing into contact the product obtained at the end of step (4) with a salt of lithium; (6) calcining in air the product obtained at the end of step (5) at a temperature between 700° C. and 1100° C.; 20 the inorganic compound M comprising or consisting essentially of a garnet oxide or garnet-type oxide containing, as constituent elements, the elements Li, La, Zr and at least one element A selected in the group consisting of Al, Ga, Nb, Fe, W, Ta, or a mixture thereof.

20 Claims, No Drawings

(56) References Cited

U.S. PATENT DOCUMENTS

| | | | |
|---|---|---|---|
| 2018/0175446 A1 | 6/2018 | Nishizaki et al. | |
| 2018/0248223 A1 | 8/2018 | Kim et al. | |
| 2018/0282174 A1* | 10/2018 | Akimoto | C01G 27/006 |
| 2019/0036159 A1 | 1/2019 | Kim et al. | |
| 2019/0051934 A1 | 2/2019 | Kim et al. | |
| 2019/0198921 A1* | 6/2019 | Takano | C01G 25/006 |
| 2019/0260072 A1* | 8/2019 | Yamamoto | H01M 4/382 |

FOREIGN PATENT DOCUMENTS

| | | | |
|---|---|---|---|
| JP | 2018065704 A | 4/2018 | |
| WO | 2000003444 A1 | 1/2000 | |

OTHER PUBLICATIONS

Murugan R. et al., "Fast Lithium Ion Conduction in Garnet-Type Li7La3Zr2O12", Angewandte Chemie International Edition, 2007, vol. 46 (41), p. 7778-7781—Wiley-VCH Verlag GmbH & Co. KGaA, Weinheim.

Awaka J. et al., "Crystal structure of fast lithium-ion-conducting cubic Li7La3Zr2O12", Chemistry Letters, 2011, vol. 40, p. 60-62—The Chemical Society of Japan.

Alcantara R. et al., "Characterisation of mesocarbon microbeads (MCMB) as active electrode material in lithium and sodium cells", Carbon, 2000, vol. 38, p. 1031-1041—Elsevier Science Ltd.

Schnell J. et al., "Prospects of production technologies and manufacturing costs of oxide-based all-solid-state lithium batteries", Energy & Environmental Science, 2019, vol. 12, p. 1818-1833—The Royal Society of Chemistry.

Thompson P. et al., "Rietveld refinement of Debye-Scherrer synchrotron X-ray data from Al2O3", Journal of Applied Crystallography, 1987, vol. 20, p. 79-83—International Union of Crystallography.

* cited by examiner

METHOD OF PREPARATION OF A GARNET-TYPE INORGANIC MATERIAL

This application is a U.S. national stage entry under 35 U.S.C. § 371 of International Application No. PCT/EP2020/071436 filed Jul. 29, 2020, which claims priority to European patent application EP 19315084.4, filed on Aug. 6, 2019.

The entire contents of these applications are explicitly incorporated herein by this reference.

The present invention relates to a method of preparation of a garnet-type inorganic material. It also relates to the garnet-type inorganic material itself.

TECHNICAL FIELD

In recent years, garnet-type inorganic materials have been attracting attention as potential materials that could contribute to the development of the all-solid lithium batteries. Indeed, J. Am. Ceram. Soc. 2003, volume 86, pages 437 to 440 reports that a garnet-type material of formula $Li_5La_3M_2O_{12}$ (wherein M is Nb or Ta) is a solid electrolyte material having remarkable lithium ion conductivity.

Angew. Chem. Int. Ed. 2007, volume 46, pages 7778 to 7781 reports that another garnet-type material based on Li, Al and Zr, of formula $Li_7La_3Zr_2O_{12}$ (hereinafter abbreviated as "LLZ"), obtained through the replacement of Nb or Ta by Zr from $Li_5La_3M_2O_{12}$ is also a solid electrolyte material having remarkable lithium ion conductivity.

Garnets have been known for a long time and correspond originally to orthosilicates of formula $A_3B_2(SiO_4)_3$ in which A and B refer to eight- and six-coordinated cation sites respectively. Lithium containing garnets are obtained by replacing silicon with lithium to provide the general composition $A_3B_2(LiO_4)_3$. Because of the ability of the garnet structure to accept a large variety of atoms of different sizes and charges, a number of different Li-oxide garnets have been prepared with Li at additional sites. Indeed, it is possible to increase the lithium content by replacing A and/or B with cations with higher or lower oxidation states thus obtaining lithium-containing garnets such as the promising solid electrolyte material of formula $Li_7La_3Zr_2O_{12}$ (LLZ).

These two materials $Li_5La_3M_2O_{12}$ and $Li_7La_3Zr_2O_{12}$ contain an excess of Li, compared with an "ideal" garnet-type structure. Having this specific crystal structure is considered to be one of the reasons why these compounds exhibit high lithium ion conductivity in a solid state. In particular, it was discovered that a LLZ containing Al as a dopant exhibits a high lithium ion conductivity as high as $10^{-4}$ S/cm at room temperature.

TECHNICAL PROBLEM

A method of preparation of an LLZ garnet-type material in the form of fine particles is desirable for the preparation of an all-solid lithium secondary battery. Indeed, the particles are used in the preparation of an electrode layer or of a separator layer. Fine particles are sought after to enhance the contact with the other components of the electrode layer or of the separator. In addition, fine particles make it also possible to prepare a thin electrode layer and a thin separator which is usually favorable to a higher energy density.

Conventional methods of preparation of an LLZ garnet-type material using a solid-state reaction process comprise a calcination step at a high temperature of 1,000 to 1,200° C. (see eg Angew. Chem. Int. Ed. 2007, volume 46, pages 7778 to 7781 which discloses a calcination step at a temperature >1000° C.). When the calcination is performed at such high temperatures, grain growth is easily promoted, which results in difficulty in directly obtaining fine particles. Furthermore, calcination at a temperature of 1,000° C. or higher is usually accompanied by volatilization of a large amount lithium which is a problem for the economy of the process and for the environment.

The need also exists of having particles which can be easily dispersed in the solvents used for the preparation of electrodes and separators.

Thus, there is a need for a process of preparation of an LLZ garnet-type material in the form of fine and easily dispersible particles.

BACKGROUND ART

JP2012-224520 discloses a process of preparation of an LLZ garnet-type material by coprecipitation involving the use of a solution comprising all elements including lithium.

US 2018/0248223 and US 2019/0051934 disclose a method of preparation of an LLZ garnet-type material involving a coprecipitation with ammoniac.

JP 2012/224520, JP 2013/256435, JP 2018/065704, US 2018/175446 and US 2019/0036159 do not disclose the process of the invention nor the inorganic material M as claimed.

BRIEF DESCRIPTION OF THE INVENTION

The invention relates to an inorganic material M as disclosed in the below claims. It also relates to a process of preparation of an inorganic material M as disclosed in the below claims. It also relates to a composition (C), an electrode (E) or a separator (SP) as disclosed, respectively, in the below claims. It also relates to the use of the inorganic material M as disclosed in the below claims and to a battery comprising said inorganic material M as disclosed in the below claims.

These objects are now further described.

The Invention

The invention relates to a process of preparation of an inorganic material M comprising the following steps:
(1) bringing an aqueous solution S comprising (i) a salt of zirconium, (ii) a salt of lanthanum and (iii) a salt of the element A or a precursor of an oxide of element A into contact with an aqueous solution of a basic compound, as a result of which a precipitate suspended in the reaction medium is obtained;
(2) stirring the reaction medium obtained at the end of step (1) for at least 30 min;
(3) bringing the precipitate obtained at the end of step (2) into contact with an additive selected in the group consisting of: anionic surfactants; nonionic surfactants; polyethylene glycols; carboxylic acids and their salts; and surfactants of the carboxymethylated fatty alcohol ethoxylate type;
(4) calcining in air the precipitate recovered at the end of the previous step at a temperature which is at least 400° C.;
(5) bringing into contact the product obtained at the end of step (4) with a salt of lithium;
(6) calcining in air the product obtained at the end of step (5) at a temperature between 700° C. and 1100° C.;

the inorganic compound M being an oxide containing, as constituent elements, the elements Li, La, Zr and at least one element A selected in the group consisting of Al, Ga, Nb, Fe, W, Ta, or a mixture thereof.

The inorganic material M can be described as exhibiting the structure of a garnet. In the context of the invention, the oxide may thus be referred to as a garnet or garnet-type oxide.

In step (1), an aqueous solution S comprising (i) a salt of zirconium (ii) lanthanum nitrate and (iii) a salt of the element A or a precursor of an oxide of element A is brought into contact with a solution of a basic compound.

The salt of zirconium is conveniently selected in the group of zirconium nitrate and zirconium chloride. The salt of zirconium may be for instance zirconium nitrate or zirconium oxynitrate. The salt of zirconium may be crystalline zirconyl nitrate. It may also be a solution of zirconium nitrate obtained by dissolving zirconium carbonate or zirconium hydroxide with nitric acid. This acid attack can preferably be carried out with a $NO_3^-/Zr$ molar ratio of between 1.7 and 2.3. In the case of zirconium carbonate, this ratio can be between 1.7 and 2.0.

The salt of lanthanum may be lanthanum nitrate.

The source of the oxide of element A may be a salt of the element A or a precursor of an oxide of element A. The source of element A may be a salt of element A such as iron nitrate, e.g. $Fe(NO_3)_3$, aluminium nitrate $Al(NO_3)_3$ or gallium nitrate $Ga(NO_3)_3$. The source of element A may be a precursor of an oxide of element A such as a coordination complex of element A such as niobium oxalate. The precursor of an oxide of element A may be an oxalate of element A. For instance, a precursor of niobium oxide may be ammonium niobium oxalate.

As basic compound, mention may be made of compounds of the hydroxide or carbonate type. The basic compound may be an hydroxide of an alkali metal or of an alkaline earth. The basic compound may also be ammonia, secondary, tertiary or quaternary amine. Ammonia is preferred as it provides strong aqueous basic solutions and as the ammonium salt released may be efficiently washed away.

Step (1) may be performed by introducing the aqueous solution S into the aqueous solution of the basic compound. At the laboratory scale, the aqueous solution S may for instance be introduced drop by drop into the aqueous solution of the basic compound.

The duration of the introduction may be between 30 and 120 minutes, more particularly between 30 min and 100 min.

Step (1) may conveniently be performed at a temperature between 5° C. and 40° C., more particularly between 10° C. and 30° C., more particularly between 15° C. and 25° C.

The amount of the basic compound which is used for the precipitation of step (1) is such that the pH of the mixture obtained at the end of step (1) is at least 7.0, more particularly at least 9.0. The amount of the basic compound used is such that the molar ratio r is higher than 1.0, more particularly greater than or equal to 1.2 (≥1.2), more particularly greater than or equal to 1.4 (≥1.4), wherein r=amount of basic compound/total amount of elements Zr, La, A in solution S.

At the end of step (1), the reaction medium comprises the precipitate dispersed in the aqueous medium.

In step (2), the reaction medium obtained at the end of step (1) is stirred for at least 30 min. According to an embodiment, the reaction medium is stirred for at least 30 minutes and the temperature of the reaction medium is between 50° C. and 200° C., more particularly between 80° C. and 150° C. The duration of step (2) may be between 30 min and 10 hours, more particularly between 30 min and 5 hours, even more particularly between 1 hour and 5 hours. The reaction medium comprises the precipitate dispersed in the aqueous medium. Step (2) is conveniently performed in a closed vessel, such as a stirred tank reactor.

In step (3), the precipitate obtained at the end of step (2) is brought into contact with an additive selected in the group consisting of: anionic surfactants; nonionic surfactants; polyethylene glycols; carboxylic acids and their salts; and surfactants of the carboxymethylated fatty alcohol ethoxylate type. Step (3) may be performed by adding the additive into a dispersion of the precipitate obtained at the end of step (2) in an aqueous medium. It has been discovered that the additive helps in obtaining the inorganic material M with a pure cubic phase (see comparative example 2).

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfo-succinates, and alkylbenzene or alkylnapthalene sulfonates. As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid. A salt of a carboxylic acid may also be used, in particular the ammonium. The additive may more particularly be lauric acid or ammonium laurate.

Finally, it is possible to use a surfactant which is selected from those of the carboxymethylated fatty alcohol ethoxylate type. The expression "product of the carboxymethylated fatty alcohol ethoxylate type" is intended to mean products consisting of ethoxylated or propoxylated fatty alcohols comprising a —$CH_2$—COOH group at the end of the chain. These products may correspond to the formula:

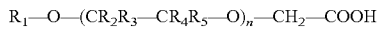

$$R_1—O—(CR_2R_3—CR_4R_5—O)_n—CH_2—COOH$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$=$CH_2$—O— groups.

The additive may be added as it is or in suspension or in solution in a liquid medium.

The amount of additive added, expressed as the ratio of the weight of the additive relative to the weight of the inorganic material M (weight of additive/weight of inorganic material M×100), is generally between 5% and 100%, more particularly between 15% and 60%, preferably between 30% to 50%. The amount may be as in example 1 (additive/inorganic material M=40%).

The process may also comprise a step (3a) after step (3), wherein the solid obtained at the end of step (3) is washed with water. An aqueous basic solution (e.g. ammoniac) may conveniently be used in step (3a). The pH of the aqueous basic solution may be at least 8.0.

In step (4), the precipitate obtained at the end of the previous step (that is either step (3) or step (3a)) is calcined in air at a temperature which is at least 400° C. The temperature should be high enough to trigger at least partially the decomposition of the additive and the release of the nitrates. The product obtained at the end of step (4) preferably contains an amount of residual carbon lower than 2.0 wt %. In practice, the temperature of calcination may be between 400° C. and 800° C., more particularly between 400° C. and 600° C. Higher temperatures are likely to induce some sintering which tend to decrease the specific surface area of the obtained product. The duration of the calcination depends on the temperature of calcination. It is generally between 30 min and 10 hours, more particularly between 1 hour and 5 hours.

In step (5), the product obtained at the end of the calcination step (4) is brought into contact with a salt of lithium. A convenient way of performing step (5) consists in impregnating the product obtained at the end of the calcination step (4) with an aqueous solution of a salt of lithium. More particularly, the aqueous solution of the salt of lithium may be added drop by drop on the solid under stirring. The salt of lithium may be for instance lithium chloride, lithium carbonate, lithium hydrogen carbonate, lithium nitrate or lithium sulfate. The salt of lithium may also selected in the group of carboxylates of lithium, such as lithium acetate, lithium citrate or lithium oxalate. Another convenient way of performing step (5) consists in mixing together the product obtained at the end of the calcination step (4) and the salt of lithium, both being in the powder form.

The amount of lithium added should preferably be slightly greater than the stoechiometric amount to take into account the loss of some of the lithium during the calcination step (6). Thus, the molar ratio amount of lithium added/stoechiometric amount of lithium may be between 1.00 and 1.20, more particularly between 1.05 and 1.15.

In step (6), the product obtained at the end of step (5) is calcined in air at a temperature between 700° C. and 1100° C. The product which is calcined comprises all the elements of the inorganic material M. The duration of the calcination may be between 2 hours and 15 hours, more particularly between 4 and 10 hours.

Under a particular embodiment of step (6), the product obtained at the end of step (5) is first calcined in air at a temperature between 700° C. and 900° C. and then calcined in air at a temperature between 900° C. and 1100° C. In this two-step calcination, the duration of each calcination may be between 4 hours and 8 hours. Under another particular embodiment of step (6), the product obtained at the end of step (5) is calcined in air at a temperature between 750° C. and 850° C. for a duration of the calcination between 4 and 8 hours.

The calcination step (6) is conveniently performed in a crucible. When the crucible is made of alumina, some aluminium atoms may migrate into the inorganic material M. This makes it possible to prepare an inorganic material M comprising a combination of Al and of at least another element A selected in the group consisting of Ga, Nb, Fe, W, Ta.

The inorganic material obtained at the end of step (6) is recovered.

About the Inorganic Material M

The inorganic material M comprises or consists essentially of the oxide as disclosed above. The inorganic material M comprises or consists essentially of a garnet oxide or garnet-type oxide exhibiting a cubic structure and containing, as constituent elements, the elements Li, La, Zr and at least one element A selected in the group consisting of Al, Ga, Nb, Fe, W, Ta, or a mixture thereof.

The garnet oxide or garnet-type oxide may be described by formula (I):

$$[Li_{x1}La_3Zr_zA_wO_{12}] \quad (I)$$

wherein:
x1, z and w are positive real numbers;
$1.20<z\leq2.10$; preferably $1.20<z\leq2.05$; preferably $1.50\leq z\leq2.00$;
$0<w\leq0.80$; preferably $0<w\leq0.60$; more preferably $0<w\leq0.30$; even more preferably $0<w\leq0.25$;
x1 is derived from the electroneutrality of the oxide.

A represents at least one element selected in the group consisting of Al, Ga, Nb, Fe, W, Ta, or a mixture thereof, more particularly in the group consisting of Al, Ga, Nb, or a mixture of thereof. A may also be selected in the group consisting of W, Ta, Ga, Nb or a mixture thereof. As particular embodiment, the inorganic material M comprises a combination of Al and of another element A selected in the group consisting of Ga, Nb, Fe, W and Ta.

z may be in one of the following ranges: $1.20<z\leq2.10$; preferably $1.20<z\leq2.05$; preferably $1.50\leq z\leq2.00$. More particularly, $1.90\leq z\leq2.10$. Even more particularly, $z\leq2.00$.

w may be in one of the following ranges: $0<w\leq0.80$; preferably $0<w\leq0.60$; more preferably $0<w\leq0.30$; even more preferably $0<w\leq0.25$. More particularly, $w\leq0.05$.

x1 is derived from the electroneutrality of the oxide. To do so, one takes into account the proportions of the constituent elements of the oxide, other than lithium and the degrees of oxidation of said elements. Moreover, the following degrees of oxidation are used: Li+I; Zr+IV; Hf+IV; La+III; Al+III; Ga+III; Nb+V; Fe+III, W+VI; Ta+V. As way of example, for the oxide of example 1, z=1.99; w=0.22, so that x1=6.38 (x1=24−3×3−4×1.99−3×0.22).

The inorganic material M and the oxide exhibit a cubic structure. The cubic structure may be determined by XRD. The cubic structure is generally described by the I a −3 d space group and possibly by the I −4 3 d space group, in particular when A=Ga, Fe or Al+Ga.

The crystal structure of the oxide is generally composed of a framework of 8-fold coordinated $LaO_8$ dodecahedra and 6-fold coordinated $ZrO_6$ octahedra. More particularly, it may be composed of a framework of 8-fold coordinated $LaO_8$ dodecahedra (24c) and 6-fold coordinated $ZrO_6$ octahedra (16a).

The relative composition of the cations in the inorganic material M corresponds to formula $$Li_xLa_3Zr_zA_w \quad (II)$$

wherein:
A is as disclosed above;
w, x and z are positive real numbers;
z and w are as disclosed above;
4.00≤x≤10.5; preferably 5.10≤x≤9.1; more preferably 6.20≤x≤7.7.

More particularly, the relative composition of the cations may be the following:
A is selected in the group consisting of Nb, Ta or a combination thereof;
1.20<z≤2.10; preferably 1.20<z≤2.05; preferably 1.50≤z≤2.00;
0.10<w≤0.80; preferably 0.20<w≤0.80; more preferably 0.20<w≤0.50;
6.20≤x≤10.35; preferably 6.20≤x≤8.84; more preferably 6.50≤x≤7.48.

More particularly, the relative composition of the cations may be the following:
A is W;
1.20<z≤2.10; preferably 1.20<z≤2.05; preferably 1.50≤z≤2.00;
0.10<w≤0.80; preferably 0.20<w≤0.80; more preferably 0.20<w≤0.50;
5.40≤x≤10.20; preferably 5.40≤x≤8.58; more preferably 6≤x≤7.26.

More particularly, the relative composition of the cations may also be the following:
A is selected in the group consisting of Al, Ga, Fe or a combination thereof;
1.90<z≤2.10; preferably 1.95≤z≤2.05; preferably 1.95≤z≤2.00;
0.10<w≤0.80; preferably 0.20<w≤0.60; more preferably 0.10<w≤0.25;
4.60≤x≤10.05; preferably 5.20≤x≤8.32; more preferably 6.25≤x≤7.37.

According to an embodiment, the relative composition of the cations in the inorganic material M may also correspond to formula $$Li_xLa_3Zr_zA1_{w1}A2_{w2} \quad (IIa)$$

wherein:
A1 is selected in the group consisting of Al, Ga, Fe or a combination thereof;
A2 is selected in the group consisting of Nb, Ta or a combination thereof;
w1, w2, x and z are positive real numbers;
1.20<z≤2.10; preferably 1.20<z≤2.05; preferably 1.50≤z≤2.00;
0<w1≤0.20;
0.10<w2≤0.80; preferably 0.20<w2≤0.80; more preferably 0.20<w2≤0.50;
w1 and w2 being such that w=w1+w2 and w≤0.80;
5.60≤x≤10.35; preferably 5.60≤x≤8.84; more preferably 5.90≤x≤7.48.

More particularly according to formula (IIa), A1=Al. More particularly according to formula (IIa), A2=Nb.

According to an embodiment, the relative composition of the cations in the inorganic material M may also correspond to formula:

$$Li_xLa_3Zr_zA1_{w1}A2_{w2} \quad (IIb)$$

wherein:
A1 is selected in the group consisting of Al, Ga, Fe or a combination thereof;
A2 is W;
w1, w2, x and z are positive real numbers;
1.20<z≤2.10; preferably 1.20<z≤2.05; preferably 1.50≤z≤2.00;
0<w1≤0.20;
0.10<w2≤0.80; preferably 0.20<w2≤0.80; more preferably 0.20<w2≤0.50;
w1 and w2 being such that w=w1+w2 and w≤0.80;
4.8≤x≤10.20; preferably 4.80≤x≤8.58; more preferably 5.40≤x≤7.26.

More particularly according to formula (IIb), A1=Al.

The composition of the inorganic material M, and consequently x, z, w, w1 and w2, may be determined by chemical analysis using analytical techniques well-known to the skilled person. A convenient method of determining the composition of the inorganic material M, and consequently of x, z, w, w1 and w2, consists in preparing an aqueous solution obtained from the chemical attack of the inorganic material M and to determine the contents of the elements in the aqueous solution by said analytical techniques. A convenient analytical method is ICP, more particularly ICP-MS (Inductively Coupled Plasma—Mass Spectrometry) or ICP-AES (Inductively Coupled Plasma—Atomic Emission Spectroscopy).

It must be noted that in the context of the present invention, x≥x1. This is explained by the fact that the element lithium is usually added in excess in step (5) of the process to take into account some potential losses at the high temperature of the calcination of step (6). As an example of this difference, the relative composition of the cations for the inorganic material M of example 1 as analyzed by ICP corresponds to $Li_{6.44}La_3Zr_{1.99}Al_{0.22}$ with x=6.44 whereas the oxide is of composition $Li_{6.38}La_3Zr_{1.99}Al_{0.22}O_{12}$ with x1=6.38.

The lithium cations are located within the crystal structure but may also possibly be located outside of the crystal structure. The crystal of the oxide includes $LiO_4$ tetrahedrons and $LiO_6$ octahedrons. More particularly, as outlined in Chem. Lett. 2011, 40, 60-62, the $Li^+$ within the crystal are generally described as being located at interstitial sites, showing tetrahedral (24d), octahedral (48 g), and distorted 4-fold (96 h) coordination.

Thus, the inorganic material M may also comprise lithium cations outside of the crystal structure. The inorganic material M may thus also comprise anions other than $O_2^-$ to ensure the electroneutrality of the inorganic material M. The anions other than $O_2^-$ may for instance be hydroxides or carbonates.

It must be noted that Zr is usually associated with Hf in the ores from which Zr is extracted. Because of that, the invention also applies to the inorganic material M and to the oxide wherein Zr is partly replaced by Hf. The molar ratio Hf/Zr is usually between 1/100 and 5/100, more particularly between 1/100 and 2/100.

The particles of the inorganic material M are made of finer particles than the ones prepared by the conventional solid-state chemistry. Finer particles are more easily dispersed in the conventional solvents (e.g. NMP) used for the preparation of the electrodes or of the separator. They also ensure more intimate contacts between the particles and the other components of the electrode or of the separator.

The particles of the inorganic material M usually exhibit a D50 between 10.0 and 50.0 μm, more particularly between 10.0 and 40.0 μm, even more particularly between 10.0 and 35.0 μm.

The particles of the inorganic material M may also exhibit a D90 which is usually less than 150.0 μm. D90 may be between 20.0 and 150.0 μm, more particularly between 20.0 and 100.0 μm.

The particles of the inorganic material M may also exhibit a D10 which is usually higher and equal to 0.5 µm. D10 may be between 0.5 and 15.0 µm, more particularly between 0.5 and 10.0 µm.

The process makes it possible to obtain an inorganic material M which is easily deagglomerated. After treatment under ultrasound, the particles of the inorganic material M usually exhibit a $D_{US}50$ which is lower than and equal to 15.0 µm, more particularly lower than and equal to 10.0 µm, even more particularly lower than and equal to 5.0 µm. This $D_{US}50$ may be between 0.5 µm and 15.0 µm, more particularly between 0.5 µm and 10.0 µm, even more particularly between 1.0 µm and 10.0 µm. The treatment under ultrasound consists in inserting an ultrasonic probe into a dispersion of 100 mg of the inorganic material M in 160 mL of NMP and in submitting the dispersion to sonication under a power of 140±10 W for 22 minutes. It is preferable that the temperature of the dispersion remains below 45° C., more particularly below 30° C.

After treatment under ultrasound, the particles of the inorganic material M usually exhibit a $D_{US}90$ which is lower and equal to 30.0 µm, more particularly lower and equal to 20.0 pm, even more particularly lower and equal to 15.0 µm.

The particles of the inorganic material M thus exhibit a large variation of D50 and D90 after the treatment under ultrasound. D50 and D90 decrease over time during sonication. Yet, it has been observed that these two parameters tend to stabilize before the end of the sonication. Thus, D50>$D_{US}50$ and D90>$D_{US}90$. The variations of D50 and D90 can be checked with the two following ratios:

$$R50(\%)=(D50-D_{US}50)/D50\times 100$$

$$R90(\%)=(D90-D_{US}90)/D90\times 100$$

R50 may be higher than 50%, more particularly higher than 60%, even more particularly higher than 70% or higher than 80%. R90 may be higher than 50%, more particularly higher than 60%, even more particularly higher than 70% or higher than 80%.

As shown in the examples, the process of the invention makes it possible to obtain an inorganic material M exhibiting a R50 higher than 70% and/or a R90 higher than 70%. It is also possible to obtain a R50 higher than 80% and/or a R90 higher than 80%.

D10, D50, D90 have the usual meaning used in the field of particle size distributions. see for instance https://www.horiba.com/fileadmin/uploads/Scientific/Documents/PSA/PSA Guidebook.pdf. Dn thus corresponds to the diameter of the particles for which n % of the particles have a diameter which is less than Dn. D50 is thus the median diameter. These parameters are determined from a distribution in volume of the diameters of a dispersion of the particles of the inorganic material M in N-methyl-2-pyrrolidone (NMP), obtained with a laser diffractometer. When D50 is measured after the treatment under ultrasound of a dispersion of the particles in NMP, it is denoted $D_{US}50$. Likewise, when D90 is measured after the treatment under ultrasound of a dispersion of the particles in NMP, it is denoted $D_{US}90$.

The laser diffractometer uses the technique of laser diffraction to measure the size of the particles by measuring the intensity of light scattered as a laser beam passes through a dispersed particulate sample. The laser diffractometer may be the Mastersizer 3000 manufactured by Malvern (see https://www.malvernpanalytical.com/en/products/product-range/mastersizer-range/mastersizer-3000).

The particles of the inorganic material M ("secondary particles") are aggregates aggregated from other, finer particles, subsequently called "primary particles". The primary particles exhibit a d50 between 0.5 µm and 7.0 µm, more particularly between 0.5 µm and 5.0 µm, even more particularly between 0.5 µm and 3.0 µm.

d50 is obtained with a statistical analysis performed on a distribution (in number) of the diameters d of the primary particles, these diameters being determined from at least one photograph obtained by SEM (Scanning Electronic Microscopy). As for D50, d50 corresponds to the median diameter of the distribution. To be meaningful, the statistical analysis is preferably performed on a high number of particles. This is usually accomplished on more than one photograph of the same sample of the particles of the inorganic material M. The number of particles taken into account for the statistical analysis is preferably be higher than 70, more particularly higher than 100, even higher than 200.

d50 is measured with an observation made at a magnification which is suitable to observe well the primary and secondary particles. The magnification may be between ×1000 and ×10000. Of course, the magnification depends on the sample and should be selected on a case by case basis. The observation may be performed either (i) by image analysis or (ii) by an operator. Observation by an operator is recommended if the particles are bonded together.

The diameter d of a primary particle which is retained is that of the circle for circumscribing the image of the primary particle as visible on the photograph. Only the primary particles of which at least half of the perimeter is defined are retained. Preferably, the circle must tangent the contour of the primary particle to at least one third of its circumference.

The process of the invention makes it possible to obtain the inorganic material M exhibiting a pure cubic structure. The expression "pure cubic structure" should be understood as meaning that the inorganic material M contains a proportion of tetragonal phase lower than 5.0%. It also contains a proportion of cubic phase higher than 95.0%. These proportions may conveniently be obtained by XRD (X ray diffraction), more particularly using a Rietveld refinement. The tetragonal phase is known to belong to the l $4_1$/a c d space group.

The process of the invention also makes it possible to obtain the inorganic material M with a low amount of the undesired compound of formula $La_2Zr_2O_7$. Indeed, the inorganic material M preferably exhibits an intensity ratio (b/a) which is less than 0.05. a and b are the intensities of the peaks which are visible on the XRD diagram respectively at 2θ between 16.0° and 17.0° and at 2θ between 28.5° and 28.7°. The higher the intensity ratio (b/a), the more $La_2Zr_2O_7$ is present as an impurity phase. It is considered that there is all the more of $La_2Zr_2O_7$ as an impurity that the temperature of calcination is high. The ratio (b/a) may be even less than 0.02, or less than 0.01. It may be comprised between 0.001 and 0.05, more particularly between 0.001 and 0.02.

About the Use of the Inorganic Material M

The inorganic material M discloses above may be used for the preparation of a lithium ion battery. The invention thus also relates to a lithium ion battery comprising the inorganic material M The inorganic material M disclosed above may be used in the preparation of an electrode E. The electrode E may be a positive electrode (noted $E_p$) or a negative electrode (noted $E_n$).

The electrode E of the invention typically comprises:
a metal substrate;
directly adhered onto said metal substrate, at least one layer L made of a composition (C) comprising:
(i) the inorganic material M as herein disclosed;
(ii) at least one electro-active compound (EAC);
(iii) optionally at least one lithium ion-conducting material (LiCM) other than the inorganic material M;
(iv) optionally at least one electro-conductive material (ECM);
(v) optionally a lithium salt (LIS);
(vi) optionally at least one polymeric binding material (P).

The term "electro-active compound" (EAC) is intended to denote a compound which is able to incorporate or insert into its structure and to release lithium ions during the charging phase and the discharging phase of an electrochemical device. An EAC is thus a compound which is able to intercale and deintercalate into its structure lithium ions. The nature of the EAC depends on whether the electrode E is a positive electrode or a negative electrode:

1) Positive Electrode $E_p$

The EAC may be a composite metal chalcogenide of formula $LiMeQ_2$ wherein:
Me is at least one metal selected in the group consisting of Co, Ni, Fe, Mn, Cr, Al and V;
Q is a chalcogen such as O or S.

The EAC may more particularly be of formula $LiMeO_2$. Preferred examples of EAC include $LiCoO_2$, $LiNiO_2$, $LiMnO_2$, $LiNi_xCo_{1-x}O_2$ (0<x<1), $LiNi_xCo_yMn_zO_2$ (0<x, y, z<1 and x+y+z=1), $Li(Ni_xCo_yAl_z)O_2$ (x+y+z=1) and spinel-structured $LiMn_2O_4$ and $Li(Ni_{0.5}Mn_{1.5})O_4$.

The EAC may also be a lithiated or partially lithiated transition metal oxyanion-based electro-active material of formula $M_1M_2(JO_4)_fE_{1-f}$ wherein:
$M_1$ is lithium, which may be partially substituted by another alkali metal representing less that 20% of $M_1$;
$M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, including 0;
$JO_4$ is any oxyanion wherein J is either P, S, V, Si, Nb, Mo or a combination thereof;
E is a fluoride, hydroxide or chloride anion;
f is the molar fraction of the $JO_4$ oxyanion, generally comprised between 0.75 and 1.

The $M_1M_2(JO_4)_fE_{1-f}$ electro-active material as defined above is preferably phosphate-based. It may exhibit an ordered or modified olivine structure.

The EAC may also be sulfur or $Li_2S$.

2) Negative Electrode $E_n$

In that case, the EAC may be selected in the group consisting of graphitic carbons able to intercalate lithium. More details about this type of EAC may be found in Carbon 2000, 38, 1031-1041. This type of EAC typically exist in the form of powders, flakes, fibers or spheres (e.g. mesocarbon microbeads).

The EAC may also be: lithium metal; lithium alloy compositions (e.g. those described in U.S. Pat. No. 6,203,944 and in WO 00/03444); lithium titanates, generally represented by formula $Li_4Ti_5O_{12}$; these compounds are generally considered as "zero-strain" insertion materials, having low level of physical expansion upon taking up the mobile ions, i.e. Li+; lithium-silicon alloys, generally known as lithium silicides with high Li/Si ratios, in particular lithium silicides of formula $Li_{4.4}Si$ and lithium-germanium alloys, including crystalline phases of formula $Li_{4.4}Ge$.

The ECM is typically selected in the group consisting of electro-conductive carbonaceous materials and metal powders or fibers. The electron-conductive carbonaceous materials may for instance be selected in the group consisting of carbon blacks, carbon nanotubes, graphite, graphene and graphite fibers and combinations thereof. Examples of carbon blacks include ketjen black and acetylene black. The metal powders or fibers include nickel and aluminium powders or fibers.

The lithium salt (LIS) may be selected in the group consisting of $LiPF_6$, lithium bis(trifluoromethanesulfonyl)imide, lithium bis(fluorosulfonyl)imide, $LiB(C_2O_4)_2$, $LiAsF_6$, $LiClO_4$, $LiBF_4$, $LiAlO_4$, $LiNO_3$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4FgSO_3$, $LiCF_3SO_3$, $LiAlCl_4$, $LiSbF_6$, LiF, LiBr, LiCl, LiOH and lithium 2-trifluoromethyl-4,5-dicyanoimidazole.

The function of the polymeric binding material is to hold together the components of the composition (C). The polymeric binding material is usually inert. It preferably should be also chemically stable and facilitate the electronic and ionic transport. The polymeric binding material is well known in the art. Non-limitative examples of polymeric binder materials include notably, vinylidenefluoride (VDF)-based (co)polymers, styrene-butadiene rubber (SBR), styrene-ethylene-buthylene-styrene (SEBS), carboxymethyl-cellulose (CMC), polyamideimide (PAI), poly(tetrafluoroethylene) (PTFE) and poly(acrylonitrile) (PAN) (co)polymers. It is preferably a fluoropolymer, more particularly a VDF-based (co)polymer comprising recurring units derived from VDF. The VDF-based (co)polymer may be for instance polyvinylidenefluoride or a copolymer of VDF and of at least one fluorinated monomer different from VDF, such as hexafluoropropylene (HFP).

The proportion of the inorganic material M in the composition (C) may be between 0.1 weight % to 80.0 weight %, based on the total weight of the composition. In particular, this proportion may be between 1.0 wt % to 60.0 wt %, more particularly between 10.0 wt % to 50.0 wt %. The thickness of the electrode (E) is not particularly limited and should be adapted with respect to the energy and power required in the application. For example, the thickness of the electrode (E) may be between 0.01 mm to 1,000 mm.

The inorganic material M may also be used in the preparation of a separator (SP). A separator is a permeable membrane placed between the anode and the cathode of a battery. Its function is to be permeable to the lithium ions while blocking electrons and assuring the physical separation between the electrodes. The separator (SP) of the invention typically comprises
the inorganic material M;
optionally at least one polymeric binding material (P);
optionally at least one metal salt, notably a lithium salt;
optionally at least one plasticizer.

The electrode (E) and the separator (SP) may be prepared using methods well-known to the skilled person. This usually mixing the components in an appropriate solvent and removing the solvent. For instance, the electrode (E) may be prepared by the process which comprises the following steps:
a slurry comprising the components of composition (C) and at least one solvent is applied onto the metal substrate;
the solvent is removed.

Usual techniques known to the skilled person are the following ones: coating and calendaring, dry and wet extrusion, 3D printing, sintering of porous foam followed by impregnation. Usual techniques of preparation of the electrode (E) and of the separator (SP) are provided in *Energy Environ. Sci.*, 2019, 12, 1818.

EXAMPLES

X-Ray Diffraction

The XRD diffractograms of the powders were acquired on a XRD goniometer in the Bragg Brentano geometry, with a Cu X Ray tube (Cu Kalpha wavelength of 1.5406 Å). The setup may be used in different optical configurations, i.e. with variable or fixed divergence slits, or Soller slits. A filtering device on the primary side may also be used, like a monochromator or a Bragg Brentano HD optics from Panalytical. If variable divergence slits are used, the typical illuminated area is 10 mm×10 mm. The sample holder is loaded on a spinner, rotation speed is typically 60 rpm during the acquisition. Tube settings were operating at 40 kV/30 mA for variable slits acquisition and at 45 kV/40 mA for fixed slits acquisition with incident Bragg Brentano HD optics. Acquisition step was 0.017° per step. Angular range is typically 5° to 90° in two theta or larger. Total acquisition time was typically 30 min or longer.

Rietveld refinements were performed using the pseudo-Voigt profile function of Thompson et al. (P. Thompson, D. E. Cox, J. B. Hastings, J. Appl. Cryst., 20 (1987), pp. 79-83). The cubic LLZO phase was indexed with the I a −3 d space group and reported atomic position and occupancy. The sample zero-shift, unit-cell parameters, scale factor, as well as isotropic size and micro-constraint broadening were refined in the model. The instrumental resolution function (IRF) was obtained from a well crystallized $LaB_6$ sample.

For b/a determination, the intensities are determined on the diffractograms relative to a baseline taken over the $2\theta$ angle range between 5.0° and 90.0°. The baseline is determined automatically using the software for analyzing the data of the diffractogram.

Determination of d50

As outlined before, d50 is obtained with a statistical analysis performed on a distribution (in number) of the diameters d of the primary particles, these diameters being determined from at least one photograph obtained by SEM (Scanning Electronic Microscopy). The scanning electron microscope must be properly aligned and adjusted according to the guidelines provided by the manufacturer. Moreover, a certified reference material may be used to check that the measured diameters are in agreement with the reality. From the cumulative particle size distribution of the diameters d, d50 is determined.

Determination of D10, D50, D90

These parameters were obtained by laser diffraction using a Malvern Mastersizer 3000. The samples are dispersed in NMP. The Mie theory is used to analyze the raw data. The following parameters were used:

for the inorganic material M: refraction index of 2.15 and absorption index of 0.01;
for NMP: refraction index of 1.46.

Determination of $D_{US}50$ and $D_{US}90$

These parameters were obtained by laser diffraction under the same conditions as disclosed above after treatment under ultrasound. The treatment under ultrasound consists in inserting an ultrasonic probe into a dispersion of 100 mg of the inorganic material M in 160 mL of NMP and in submitting the dispersion to sonication under a power of 140±10 W for 22 minutes. Use was made of an external ultrasound probe (750 W generator—Synetude Lab 750) adjusted to deliver 140±10 W. An ice bath was used to make sure that the suspension does not heat upper than 45° C. during the measurement.

The external ultrasonic probe was directly connected to the laser diffractometer so that it was possible to determine D50 and D90 over time (one measurement every 13 s, 100 measurements for the whole analysis of defragmentation of the particles). It was observed that for the inorganic materials M of the invention that D50 and D90 decreased over time and reached a plateau.

The process of the invention makes it possible to obtain other inorganic materials M of various compositions. See the examples 1-6 below.

Example 1: Preparation of an Inorganic Material M According to the Invention

The precursor is prepared with the process of the invention. A solution S is prepared by mixing 387.2 g of distilled water, 95 g of a solution of $La(NO_3)_3$ (C=472.5 g/L, density d=1.7111), 69.8 g of a solution of $ZrO(NO_3)_2$ (C=268.1 g/L, d=1.415), 4.03 g of $Al(NO_3)_3$ previously dissolved in 8 g distilled water. Solution S is fed drop by drop in 1 hour into a tank reactor (volume of 1 L) stirred at 400 rpm and comprising 429.5 g of distilled water and 63.4 g of concentrated ammonia (28.0 wt %). The amount of ammonia used corresponds to an excess of 40% (molar ratio r=1.40). A white precipitate is formed.

After the addition, the mixture is drained from the reactor and transferred into a sealed pressurized tank (autoclave) where it is heated for 4 hours at 150° C. with a heating ramp of 2.5° C./min under stirring (150 tours/min). The mixture is then left to cool down to room temperature under stirring and is drained from the autoclave.

An organic additive (lauric acid, 40 wt % based on the final expected weight of the inorganic material) is added to the precipitate under stirring (400 tours/min). At the end of the addition, stirring is maintained for 30 minutes. The mixture is then filtrated and washed with basic water (volume of basic water: 1 L; pH around 9).

The cake is then calcined in air at 500° C. for 4 hours. The temperature of calcination of 500° C. is reached with a heating ramp of 4° C./min. The Al-doped precursor is then ground in a mortar to obtain an homogeneous product.

To obtain 5 g of the inorganic material M, 5.54 g of the Al-doped precursor are weighed (corresponding to 90.3% of oxides). A solution of lithium nitrate is prepared (3.26 g of $LiNO_3$ dissolved in 2.0 g water). This corresponds to an excess of Li of 10.0%. The Al-doped precursor is impregnated with the aqueous solution of $LiNO_3$ by adding dropwise the solution onto the precursor which is being stirred with a spatula. A humid cake is obtained at the end of this step. The cake is dried for 2 hours at 120° C. in a preheated stove, then ground in a mortar. The powder is then calcined in air at 900° C. for 6 h in a covered crucible made of alumina, the temperature of calcination being reached with a heating ramp of 5° C./min. The powder obtained after the calcination is then ground in a mortar. The powder is then calcined in air a second time at 1000° C. for 6 h with a heating ramp of 5° C./min and a cooling ramp of 2° C./min in a covered crucible made of alumina. The powder is ground in a mortar.

The relative composition of the cations in the inorganic material M obtained after the impregnation and calcination corresponds to $Li_{6.44}Al_{0.22}La_3Zr_{1.99}$ (determined by ICP).

Example 2: preparation of an inorganic material M according to the invention The exact same process as described in example 1 was performed except that in step (6), only one calcination step at 800° C. for 6 h was applied. The temperature of 800° C. is reached after a heating ramp of 5° C./min.

Example 3: preparation of an inorganic material M according to the invention The same process as described in example 1 was performed except that Ga(NO$_3$)$_3$ was used instead of Al(NO$_3$)$_3$ in the solution S. The relative composition of the cations in the inorganic material M obtained after the impregnation and calcination corresponds to Li$_{6.80}$Al$_{0.05}$Ga$_{0.19}$La$_3$Zr$_{1.94}$ (determined by ICP).

Example 4: Preparation of an Inorganic Material M According to the Invention The same process as described in example 1 was performed except that a mixture of Al(NO$_3$)$_3$ and Ga(NO$_3$)$_3$ was used in the solution S. The relative composition of the cations in the inorganic material M obtained after the impregnation and calcination corresponds to Li$_{6.65}$Al$_{0.13}$Ga$_{0.10}$La$_3$Zr$_{1.94}$ (determined by ICP).

Example 5: Preparation of an Inorganic Material M According to the Invention The precursor is prepared with the process of the invention. A solution S is prepared by mixing 393.4 g of distilled water, 95.66 g of La(NO$_3$)$_3$ (C=472.5 g/L, density d=1.7111), 52.78 g of ZrO(NO$_3$)$_2$ (C=268.1 g/L, d=1.415), 18.73 g of ammonium niobium oxalate represented by formula C$_6$H$_4$NNbO$_{12}$. Solution S is fed drop by drop in 1 hour into a tank reactor (volume of 1 L) stirred at 400 rpm and comprising 428.4 g of distilled water and 64.4 g of concentrated ammonia (28.0 wt %). The amount of ammonia used corresponds to an excess of 40% (molar ratio r=1.40). A white precipitate is formed.

After the addition, the mixture is heated for 4 hours at 98° C. in the reactor under stirring (400 tours/min). The mixture is then left to cool down to room temperature overnight under stirring.

An organic additive (lauric acid, 40% of the final oxide weight expected) is added to the precipitate under stirring (400 tours/min). At the end of the addition, the stirring continues for 30 minutes. The mixture is then filtrated and washed with basic water (volume of basic water: 1 L; pH around 9).

The cake is then calcined in air at 500° C. for 4 hours. The temperature of calcination of 500° C. is reached with a heating ramp of 4° C./min. The Nb doped precursor is then ground in a mortar to obtain an homogeneous product.

To obtain 5 g of the inorganic material M, 5.58 g of the Nb doped precursor are weighed (corresponding to 89.7% of oxides). A solution of lithium nitrate is prepared (3.06 g of LiNO$_3$ dissolved in 2.9 g water). This corresponds to an excess of Li of 10.0%. The Nb doped precursor is impregnated with the aqueous solution of LiNO$_3$ by adding dropwise the solution onto the precursor which is being stirred with a spatula. A humid cake is obtained at the end of this step. The cake is dried for 2 hours at 110° C. in a preheated stove, then ground in a mortar. The powder is then calcined in air at 900° C. for 6 h in a covered crucible made of alumina, the temperature of calcination being reached with a heating ramp of 5° C./min. The powder is then ground in a mortar. The powder is then calcined in air a second time at 1000° C. for 6 h with a heating ramp of 5° C./min and a cooling ramp of 2° C./min in a covered crucible made of alumina. The powder is ground in a mortar. The relative composition of the cations in the inorganic material M obtained after the impregnation and calcination corresponds to Li$_{7.00}$Al$_{0.03}$Nb$_{0.57}$La$_3$Zr$_{1.45}$ (determined by ICP).

Example 6: Preparation of an Inorganic Material M According to the Invention The precursor is prepared with the process of the invention. A solution S is prepared by mixing 395 g of distilled water, 94.24 g of La(NO$_3$)$_3$ (C=472.5 g/L, density d=1.7111), 69.26 g of ZrO(NO$_3$)$_2$ (C=268.1 g/L, d=1.415), 4.39 g of Fe(NO$_3$)$_3$. Solution S is fed drop by drop in 1 hour into a tank reactor (volume of 1 L) stirred at 400 rpm and comprising 433.8 g of distilled water and 66.2 g of concentrated ammonia (28.0 wt %). The amount of ammonia used corresponds to an excess of 40% (molar ratio r=1.40). A white precipitate is formed.

After the addition, the mixture is drained from the reactor and transferred into a sealed pressurized tank (autoclave) where it is heated for 4 hours at 150° C. with a heating ramp of 2.5° C./min under stirring (150 tours/min). The mixture is then left to cool down to room temperature under stirring and is drained from the autoclave.

An organic additive (lauric acid, 40% of the final oxide weight expected) is added to the precipitate under stirring (400 tours/min). At the end of the addition, the stirring continues for 30 minutes. The mixture is then filtrated and washed with basic water (volume of basic water: 1 L; pH around 9).

The cake is then calcined in air at 500° C. for 4 hours. The temperature of calcination of 500° C. is reached with a heating ramp of 4° C./min. The Fe doped precursor is then ground in a mortar to obtain an homogeneous product.

To obtain 5 g of the inorganic material M, 5.62 g of the Fe doped precursor are weighed (corresponding to 89.0% of oxides). A solution of lithium nitrate is prepared (2.96 g of LiN dissolved in 4.4 g water). This corresponds to an excess of Li of 10.0%. The Fe doped precursor is impregnated with the aqueous solution of LiN by adding dropwise the solution onto the precursor which is being stirred with a spatula. A humid cake is obtained at the end of this step. The cake is dried for 2 hours at 120° C. in a preheated stove, then ground in a mortar. The powder is then calcined in air at 900° C. for 6 h in a covered crucible made of alumina, the temperature of calcination being reached with a heating ramp of 5° C./min. The powder is then ground in a mortar. The powder is then calcined in air a second time at 1000° C. for 6 h with a heating ramp of 5° C./min and a cooling ramp of 2° C./min in a covered crucible made of alumina. The powder is ground in a mortar.

The relative composition of the cations in the inorganic material M obtained after the impregnation and calcination corresponds to Li$_{6.91}$Al$_{0.05}$Fe$_{0.21}$La$_3$Zr$_{1.97}$ (determined by ICP).

Comparative Example C1: Preparation of an Inorganic Material by a Conventional Solid State Technique The inorganic material was prepared by a conventional solid state technique. For this purpose 10.44 g Li$_2$CO$_3$, 9.80 g $ZrO_2$, 19.40 g $La_2O_3$ and 0.41 g $Al_2O_3$ are mixed together using a 3D shaker with balls made of $ZrO_2$—$Y_2O_3$ (diameter=1 cm) during 2 h. The powder/ball/air ratio is ⅓/⅓/⅓ in volume. 19.5 g of the obtained mixture is added into an alumina crucible with an alumina cover and calcined in air during 12 h at 900° C. with a heating ramp of 5° C./min and a cooling ramp of 2° C./min. The calcined powder is mixed for 2 h in the 3D shaker using the same balls in the same proportions as already disclosed. The mixture is then calcined in air at 1000° C. for 12 h with a heating ramp of 5° C./min and a cooling ramp of 2° C./min, before being mixed again for 2 h in the 3D shaker with the same balls. Finally a last calcination step at 1100° C. for 12 h with a heating ramp of 5° C./min and a cooling ramp of 2° C./min is performed before grinding to obtain the final product.

Comparative Example C2: Preparation of an Inorganic Material without Lauric Acid The recipe used corresponds to the one described in example 1 but without any lauric acid.

under ultrasound which consists of inserting an ultrasonic probe into a dispersion of 100 mg of the inorganic material M in 160 mL of NMP and in submitting the dispersion to sonication under a power of 140±10 W for 22 minutes and/or a ratio R90 higher than 50%, R90 being defined by:

$$R90\ (\%) = (D90 - D_{us}90)/D90 \times 100$$

wherein D90 and $D_{us}90$ correspond to the diameters of the particles for which 90% of the particles have a diameter which is less than D90 and are determined from distributions in volume of the diameters of a dispersion of the particles of the inorganic material M in N-methyl-2-pyrrolidone (NMP), obtained with a laser diffractometer, $D_{us}90$ being measured after a treatment under ultrasound which consists of inserting an ultrasonic probe into a dispersion of 100 mg of the inorganic material M in 160 mL of NMP and in submitting the dispersion to sonication under a power of 140±10 W for 22 minutes.

TABLE I

| | Composition garnet oxide | of the cations | XRD amount of cubic phase | ratio b/a | d50 (μm) by SEM | Laser diffraction in NMP | | | | | | |
|---|---|---|---|---|---|---|---|---|---|---|---|---|
| | | | | | | D10 | D50 | D90 | $D_{US}50$ | $D_{US}90$ | R50 | R90 |
| | | | | | | (μm) | | | | | (%) | |
| 1 | $Li_{6.38}Al_{0.22}La_3Zr_{1.99}O_{12}$ | $Li_{6.44}Al_{0.22}La_3Zr_{1.99}$ | >95% | 0.012 | 2.4 | 12.9 | 35.4 | 67.2 | 7.7 | 15.9 | 78% | 76% |
| 2 | $Li_{6.55}Al_{0.23}La_3Zr_{1.94}O_{12}$ | $Li_{6.83}Al_{0.23}La_3Zr_{1.94}$ | | 0.104 | 0.6 | 7.4 | 30.7 | 111.0 | 3.4 | 14.4 | 89% | 87% |
| 3 | $Li_{6.52}Al_{0.05}Ga_{0.19}La_3Zr_{1.94}O_{12}$ | $Li_{6.80}Al_{0.05}Ga_{0.19}La_3Zr_{1.94}$ | >95% | | | | | | | | | |
| 4 | $Li_{6.55}Al_{0.13}Ga_{0.10}La_3Zr_{1.94}$ | $Li_{6.65}Al_{0.13}Ga_{0.10}La_3Zr_{1.94}$ | >95% | | | 5.71 | 16.8 | 48.9 | 3.81 | 8.9 | 77% | 82% |
| 5 | $Li_{6.26}Al_{0.03}Nb_{0.57}La_3Zr_{1.45}$ | $Li_{7.00}Al_{0.03}Nb_{0.57}La_3Zr_{1.45}$ | 95% | 0.060 | | 8.14 | 24.2 | 72.5 | 5.67 | 13.9 | 77% | 81% |
| 6 | $Li_{6.34}Al_{0.05}Fe_{0.21}La_3Zr_{1.97}$ | $Li_{6.91}Al_{0.05}Fe_{0.21}La_3Zr_{1.97}$ | >95% | 0.002 | | 14.5 | 34.3 | 138 | 6.03 | 14.2 | 82% | 90% |
| C1 | $Li_{6.12}Al_{0.24}La_3Zr_{2.04}$ | $Li_{6.46}Al_{0.24}La_3Zr_{2.04}$ | >95% | | 6.1 | 10.9 | 22.6 | 38.9 | 17.5 | 19.4 | 23% | 12% |
| C2 | $Li_{6.40}Al_{0.20}La_3Zr_{2.00}$ | $Li_{6.79}Al_{0.20}La_3Zr_{2.00}$ | 63% | | | | | | | | | |

The invention claimed is:

1. An inorganic material M comprising a garnet oxide or garnet-type oxide containing, as constituent elements, the elements Li, La, Zr and at least one element A selected from the group consisting of Al, Ga, Nb, Fe, W, Ta, and a mixture thereof, the oxide being described by formula (I):

$$[Li_{x1}La_3Zr_zA_wO_{12}] \quad (I)$$

wherein:
x1, z and w are positive real numbers;
1.20<z≤2.10;
0<w≤0.80; and
x1 is derived from the electroneutrality of the oxide; and exhibiting:
a ratio R50 higher than 50%, R50 being defined by:

$$R50(\%) = (D50 - D_{US}50)/D50 \times 100$$

wherein D50 and $D_{us}50$ are the median diameters of distributions in volume of the diameters of a dispersion of the particles of the inorganic material M in N-methyl-2-pyrrolidone (NMP), obtained with a laser diffractometer, $D_{us}50$ being measured after a treatment 2. The inorganic material M according to claim 1 wherein the relative composition of the cations in the inorganic material M corresponds to formula:

$$Li_{x1}La_3Zr_zA_w \quad (II)$$

wherein:
w, x and z are positive real numbers;
1.20<z≤2.10;
0<w≤0.80; and
4.00≤x≤10.5.

3. The inorganic material M according to claim 1 wherein the relative composition of the cations in the inorganic material M corresponds to formula:

$$Li_xLa_3Zr_zA1_{w1}A2_{w2} \quad (IIa)$$

wherein:
A1 is selected from the group consisting of Al, Ga, Fe or a combination thereof;
A2 is selected from the group consisting of Nb, Ta or a combination thereof;
w1, w2, x and z are positive real numbers;
1.20<z≤2.10;

0<w1≤0.20;
0.10<w2≤0.80;
w1 and w2 being such that w=w1+w2 and w≤0.80; and
5.60≤x≤10.35.

4. The inorganic material M according to claim 1 wherein the relative composition of the cations in the inorganic material M corresponds to formula:

$$Li_xLa_3Zr_zA1_{w1}A2_{w2} \quad (IIb)$$

wherein:
A1 is selected from the group consisting of Al, Ga, Fe or a combination thereof;
A2 is W;
w1, w2, x and z are positive real numbers;
1.20<z≤2.10;
0<w1≤0.20;
0.10<w2≤0.80;
w1 and w2 being such that w=w1+w2 and w≤0.80; and
4.80≤x≤10.20.

5. The inorganic material M according to claim 1 wherein Zr is partly replaced by Hf in the oxide.

6. The inorganic material M according to claim 1 wherein the primary particles of the inorganic material M exhibit a d50 between 0.5 µm and 7.0 µm.

7. The inorganic material M according to claim 1 wherein the particles of the inorganic material M exhibt a D50 between 10.0 and 50.0 µm.

8. A process of preparation of the inorganic material M of claim 1, the process comprising the following steps:
(1) bringing an aqueous solution S comprising (i) a salt of zirconium, (ii) a salt of lanthanum and (iii) a salt of the element A or a precursor of an oxide of element A into contact with an aqueous solution of a basic compound, as a result of which a precipitate suspended in the reaction medium is obtained;
(2) stirring the reaction medium obtained at the end of step (1) for at least 30 min;
(3) bringing the precipitate obtained at the end of step (2) into contact with an additive selected from the group consisting of: anionic surfactants; nonionic surfactants; polyethylene glycols;
carboxylic acids and their salts; and surfactants of the carboxymethylated fatty alcohol ethoxylate type;
(4) calcining in air the precipitate recovered at the end of the previous step at a temperature which is at least 400° C.;
(5) bringing into contact the product obtained at the end of step (4) with a salt of lithium;
(6) calcining in air the product obtained at the end of step (5) at a temperature between 700° C. and 1100° C.;
the inorganic compound M comprising or consisting essentially of a garnet oxide or garnet-type oxide containing, as constituent elements, the elements Li, La, Zr and at least one element A selected in the group consisting of Al, Ga, Nb, Fe, W, Ta, or a mixture thereof.

9. The process according to claim 8 wherein the salt of zirconium is selected from the group of zirconium nitrate and zirconium chloride.

10. The process according to claim 8 wherein in step (2), the reaction medium is stirred for at least 30 minutes and the temperature of the reaction medium is between 50° C. and 200° C.

11. The process according to claim 8 wherein the additive is a carboxylic acid or a salt thereof.

12. The process according to claim 8 wherein the temperature of calcination in step (4) is between 400° C. and 800° C.

13. The process according to claim 8 wherein the bringing into contact of step (5) consists of impregnating the product obtained at the end of the step (4) with an aqueous solution of a salt of lithium or in mixing together the product obtained at the end of step (4) and the salt of lithium, both being in the powder form.

14. The process according to claim 8 wherein in step (6), the product obtained at the end of step (5) is first calcined in air at a temperature between 700° C. and 900° C. and then calcined in air at a temperature between 900° C. and 1100° C.

15. An inorganic material M obtainable by the process according to claim 8.

16. A composition (C) comprising:
(i) the inorganic material M of claim 1;
(ii) at least one electro-active compound (EAC);
(iii) optionally at least one lithium ion-conducting material (LiCM) other than the inorganic material M;
(iv) optionally at least one electro-conductive material (ECM);
(v) optionally a lithium salt (LIS); and
(vi) optionally at least one polymeric binding material (P).

17. An electrode (E) comprising:
a metal substrate;
directly adhered onto said metal substrate, at least one layer L made of a composition (Cof claim 16.

18. A separator (SP) comprising:
the inorganic material M claim 1;
optionally at least one polymeric binding material (P);
optionally at least one metal salt, notably a lithium salt; and
optionally at least one plasticizer.

19. Lithium ion battery comprising the inorganic material M of claim 1.

20. An inorganic material M comprising a garnet oxide or garnet-type oxide containing, as constituent elements, the elements Li, La, Zr and at least one element A selected from the group consisting of Al, Ga, Nb, Fe, W, Ta, and a mixture thereof, the oxide being described by formula (I):

$$[Li_{x1}La_3Zr_zA_wO_{12}] \quad (I)$$

wherein:
x1, z and w are positive real numbers;
1.20<z≤2.10;
0<w≤0.80;
x1 is derived from the electroneutrality of the oxide; and
exhibiting:
a ratio R50 higher than 50%, R50 being defined by:

$$R50(\%)=(D50-D_{us}50)/D50\times100$$

wherein D50 and $D_{us}50$ are the median diameters of distributions in volume of the diameters of a dispersion of the particles of the inorganic material M in N-methyl-2-pyrrolidone (NMP), obtained with a laser diffractometer, $D_{us}50$ being measured after a treatment under ultrasound which consists of inserting an ultrasonic probe into a dispersion of 100 mg of the inorganic material M in 160 mL of NMP and in submitting the dispersion to sonication under a power of 140±10 W for 22 minutes.

* * * * *